C. W. KING.
SELF SETTING TRAP.
APPLICATION FILED MAR. 27, 1912.
1,066,208.
Patented July 1, 1913.
2 SHEETS—SHEET 2.
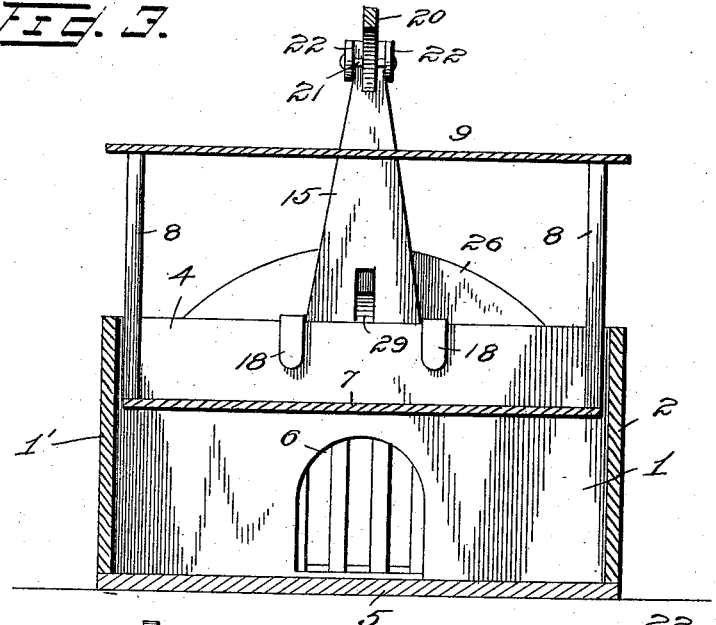
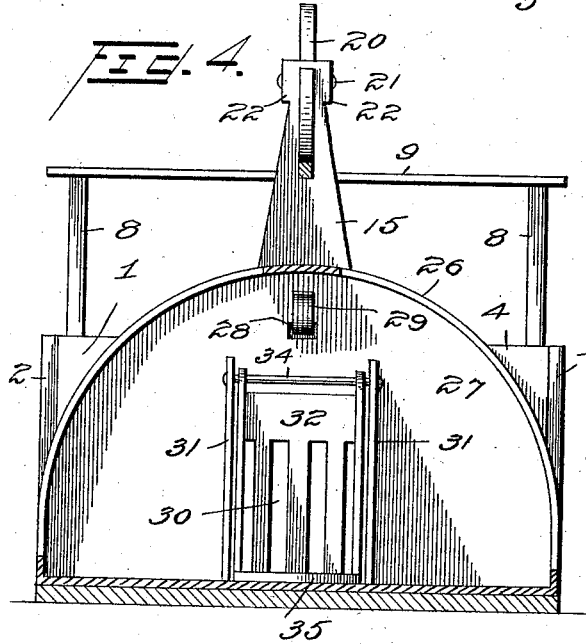
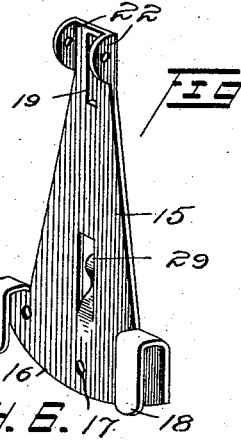
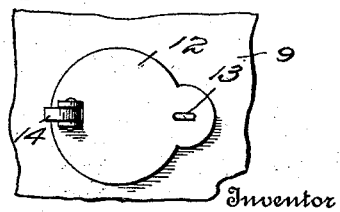
Witnesses
Inventor
C. W. King
By Victor J. Evans
Attorney

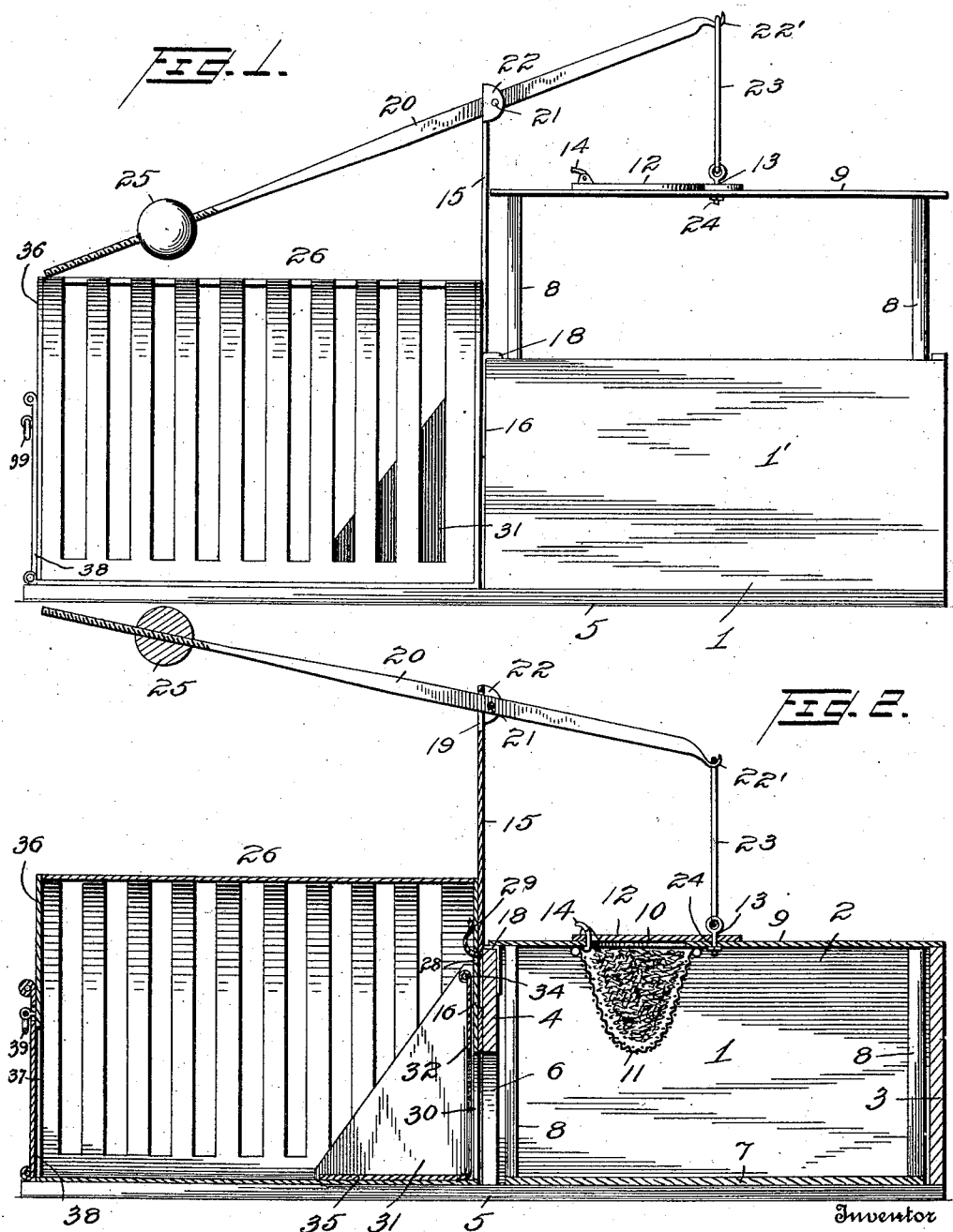

UNITED STATES PATENT OFFICE.

CHARLES W. KING, OF ST. LOUIS, MISSOURI.

SELF-SETTING TRAP.

1,066,208.  Specification of Letters Patent.  Patented July 1, 1913.

Application filed March 27, 1912. Serial No. 686,500.

*To all whom it may concern:*

Be it known that I, CHARLES W. KING, a citizen of the United States, residing in the city of St. Louis and State of Missouri, have invented new and useful Improvements in Self-Setting Traps, of which the following is a specification.

This invention relates to animal traps, the object in view being to provide what may be termed a self-setting trap, especially designed for catching rodents, the parts of the trap being so arranged as to render the same self-setting, so that the rodents may be successively caught and retained within a suitable cage forming a detachable part of the trap proper.

A further object of the invention is to provide means whereby the movable portion of the trap may be balanced in accordance with the amount and weight of the bait placed therein and the class of animals to be captured thereby.

With the above and other objects in view, the invention consists in the novel construction, combination and arrangement of parts, hereinafter fully described, illustrated and claimed.

In the accompanying drawing, Figure 1 is a side elevation of the complete trap. Fig. 2 is a vertical longitudinal section through the same. Fig. 3 is a vertical cross section through the pen and movable platform. Fig. 4 is a cross section through the cage looking toward the pen. Fig. 5 is a detail perspective view of the fulcrum post. Fig. 6 is a detail plan view showing the bait cover.

Referring to the drawing, 1 designates a pen closed on all sides by the vertical side walls 1', 2, 3 and 4, and also closed at the bottom by a base 5, which is extended a suitable distance beyond the side wall 4, as shown, to provide a rest for the cage, hereinafter described, the wall 4 being provided with an exit 6, for allowing the animal to enter the cage after being caught and confined within the pen. The pen resembles an ordinary box, substantially square in plan view and normally open at the top, as shown, while arranged to move up and down within said pen, is a platform 7. Extending upward from the four corners of the platform 7, which is of the same shape but slightly smaller than the interior dimensions of the pen, are corner posts 8, while secured to the top of the corner posts, is a cover or roof 9, said cover and platform being rigidly connected together by means of the corner posts 8. The opening 10 is formed through the cover or roof 9 and connected to the under side of the roof is a bait holder 11, in which the bait is adapted to be inserted through the opening 10 in the roof or cover. The hole 10 is adapted to be opened and closed by means of a cover 12 pivotally mounted at 13 on the roof and provided with an operating finger piece 14.

Secured to and extending upward from the wall 4 is a bracket 15, which is conveniently and cheaply formed of a sheet metal blank embodying a base 16 secured to the wall by means of suitable fasteners 17 and provided with hook-shaped extensions 18, which fit over the top edges of the wall 4 and properly position the bracket thereon. The fulcrum post is extended to a suitable height, and adjacent to the top thereof, it is provided with a slot 19, through which passes a balancing lever 20, said lever being fulcrumed on a pin 21 inserted through laterally projecting ears 22 at or near the top of the bracket, as clearly shown. At one end the lever 20 is provided with a hook 22', to which is connected a suspending link 23, attached at its lower end to the roof or cover 9 at the point 24. The opposite arm of the lever 20 is in the form of a rod which is screw-threaded to receive a threaded counter-balancing weight 25, which may thereby be adjusted toward and away from the end of the lever for balancing the movable platform in an elevated position, the adjustment of the weight providing for the proper balancing of the platform in accordance with the weight of the bait while allowing the platform to be depressed by the weight of the animal imposed thereon.

26 designates a cage mounted upon the extended base of the platform and provided in its inner wall 27 with an opening 28 adapted to receive a catch 29 on the bracket 15, above described, whereby the cage may be connected to the remainder of the trap to prevent possibility of accidental displacement, while permitting the cage to be readily removed when necessary.

In its inner wall 27 the cage is provided with an entrance opening 30 for the rodents and within the cage there are lateral guard walls 31 between which is arranged a pivotally mounted gate 32, hinged upon a pin 34, and provided at its bottom with an inwardly extending flange or foot piece 35, which serves to prevent rodents from opening the gate, it being necessary for the rodent to place his front foot upon said flange while endeavoring to open the gate. The opposite or front wall 36 of the cage is provided with an exit opening 37 through which the animals are adapted to be removed, said opening 37 being normally closed by a hinged door 38 held locked or closed by any suitable fastening device 39.

From the foregoing description taken in connection with the drawing, it will be understood that the animal in order to obtain access to the bait must necessarily mount the platform and as soon as the weight of the animal is imposed thereon the platform descends, thus trapping the animal within the pen. The animal in trying to escape passes through the opening 6, lifting the pivoted gate, which then closes behind him and he is then finally caught within the cage described. As soon as the platform is relieved of the weight of the animal it moves upward under the influence of the balancing lever, thereby resetting the trap for the succeeding animal.

I claim:

1. A self-setting trap, comprising a flat base, a pen fixed thereon and left open at the top and also provided with an exit in one side, a covered depressible platform, movable vertically in said pen and open on all sides, a cage supported on the base and having an inlet opening opposite the exit of the pen, a sheet metal bracket extending upwardly from the inner side wall of the pen, a platform balancing lever pivotally supported by said bracket, and a spring hook on said bracket insertible through an opening in the adjacent cage wall.

2. A self-setting trap, comprising a flat base, a pen fixed thereon and left open at the top and also provided with an exit in one side, a covered depressible platform movable vertically in said pen and open on all sides, a cage supported on the base and having an inlet opening opposite the exit of the pen, a sheet metal bracket extending upwardly from the inner side wall of the pen, a platform balancing lever pivotally supported by said bracket, a spring hook on said bracket insertible through an opening in the adjacent cage wall, and integral fingers on said bracket embracing the top edge of the inner wall of the pen.

In testimony whereof I affix my signature in presence of two witnesses.

CHARLES W. KING.

Witnesses:
MARY B. PALMER,
G. R. HESS.